Jan. 26, 1971   W. PEARCE, JR   3,559,152

LAMP SOCKET AND PANEL ASSEMBLY

Filed June 7, 1968

INVENTOR
Warren Pearce, Jr.
BY
W. A. Schuetz
ATTORNEY

United States Patent Office 3,559,152
Patented Jan. 26, 1971

3,559,152
LAMP SOCKET AND PANEL ASSEMBLY
Warren Pearce, Jr., Warren, Ohio, assignor to General Motors Corporation, Detroit, Mich., a corporation of Delaware
Filed June 7, 1968, Ser. No. 735,389
Int. Cl. H01r 9/22
U.S. Cl. 339—60           3 Claims

ABSTRACT OF THE DISCLOSURE

In a preferred form, this disclosure relates to a lamp socket and panel assembly. The panel has an opening whose outer peripheral surface is defined by alternately spaced lands and recesses and the lamp socket is provided with a radially extending flange intermediate its ends and circumferentially spaced, radially extending lands on its forward end and with the rear faces of the lands being axially spaced from the flange a distance less than the thickness of the panel. The lamp socket is connected to the panel by aligning the lands thereon with the recesses in the panel, inserting the socket through the opening in the panel until the flange engages the panel and then rotating the socket to position the lands thereon behind the lands on the panel, the flange sealingly engaging the adjacent side of the panel when the socket is connected thereto. The socket includes axially extending ribs between the rear faces of some of its lands and the sealing flange which cooperate with the bottoms of the recesses to lock the socket in place on the panel unless manually grasped and rotated in the opposite direction and which engage a land on the panel to stop further rotation to properly position the lands on the socket behind the lands on the panel.

---

The present invention relates to a lamp socket, and in particular to a lamp socket and panel assembly wherein the lamp socket is both readily connectable to and disconnectable from the panel and locked in place on the panel when connected thereto.

Known lamp socket and panel assemblies have included a panel provided with an opening having an outer peripheral surface defined by alternately spaced lands and recesses and a lamp socket provided with a radially extending flange intermediate its ends and circumferentially spaced, radially extending lands on its forward end and with the rear faces of the lands being spaced from the flange an axial distance less than the thickness of the panel. These known lamp sockets were connected to the panel by aligning the lands on the lamp socket with recesses in the panel, inserting the forward end of the socket through the opening until the flange engages the panel and then rotating the socket to position the lands on the lamp socket behind the lands on the panel, the flange sealingly engaging the adjacent side of the panel when the socket was connected thereto. Examples of such known lamp socket and panel assemblies are shown in U.S. Pats. Nos. 3,017,599 and 2,725,546.

However, to hold the lamp socket against relative rotational movement with respect to the panel, these known lamp socket and panel assemblies either relied on the pressure engagement between the flange and the lands on the opposite sides of the panel or employed a separate fastening means, such as a screw, extending through the flange and the panel. While these known assemblies have generally been satisfactory, the former holding method has not been entirely satisfactory for use in environments where vibrations are encountered, such as for use on certain areas of automotive vehicles, and the latter is unsatisfactory from the standpoint that it requires additional assembly time as well as increasing the cost of the assembly.

The present invention provides a new and improved lamp socket and panel assembly of the above noted type and which incorporates a novel locking means to hold the lamp socket against relative rotation with respect to the panel even when used in applications where vibrational forces are encountered, such as when used on certain areas of automotive vehicles. The locking feature is integral with the lamp socket and cooperates with the panel to hold the lamp socket in place, but yet enables the lamp socket to be manually rotated so as to be readily detachable from the panel when replacement of the lamp bulb is necessitated.

Accordingly, an important object of the present invention is to provide a new and improved lamp socket and panel assembly of the character referred to above and which is of a highly practical and economical construction, readily connectable to and disconnectable from the panel and of a construction and arrangement such that the lamp socket when connected to the panel is locked against rotational movement relative to the panel unless manually grasped and rotated.

Another object of the present invention is to provide a new and improved lamp socket and panel assembly of the character referred to above and in which the recesses of the opening in the panel have bottoms whose end portions are spaced from the central axis of the opening a greater distance than their midportions, and in which the lamp socket has elastic axially extending locking ribs between at least some of the lands and the radially extending flange and which are self-biased toward a normal position, and wherein the ribs are disposed adjacent an end portion of the bottom of the recesses in the panel when the lamp socket is inserted through the opening, but engageable with the midportions of the bottoms of the recesses so as to be deflected from their normal position as the socket is rotated to connect the same to the panel until the ribs are moved past the midportions toward the other end portion of the bottoms of the recesses whereupon they return or substantially return toward their normal position, the relative position between the ribs and the midportion of the bottoms of the recesses serving to lock the lamp socket in place when connected to the panel unless manually grasped and rotated in the opposite direction.

Yet another object of the present invention is to provide a new and improved lamp socket and panel assembly, as defined in the next preceding object, and in which the ribs are also engageable with the adjacent land on the panel when connected thereto and serve as a stop to limit the extent of rotation of the socket so as to properly position the lands on the socket behind the lands on the panel.

The advantages of the lamp socket and panel assembly of the present invention are that the lamp socket can be readily manually connected and disconnected from the panel, but yet, when connected, the lamp socket is self-locked in place on the panel to prevent relative rotational movement therebetween. Moreover the lamp socket when inserted through the opening in the panel and rotated to connect the same thereto cannot be overrotated due to the provision of the axial ribs which abuttingly engage the adjacent land to provide a stop so as to insure that the lamp socket is properly connected to the panel. Furthermore, by forming the axially extending locking ribs integral with the lamp socket, no separate element is necessary to positively hold the socket in place when connected to the panel. This not only provides an economical lamp socket construction, but minimizes the time required for assembling the lamp socket to the panel.

The present invention further resides in various novel constructions and arrangement of parts, and further objects, novel characteristics and advantages of the present invention will be apparent to those skilled in the art to which it relates and from the following detailed description of the illustrated, preferred embodiment thereof made with reference to the accompanying drawings forming a part of this specification and in which similar reference numerals are employed to designate corresponding parts throughout the several views, and in which.

The present invention provides a novel lamp socket and panel assembly wherein the lamp socket is both readily connectable to and disconnectable from the panel and locked in place on the panel when connected thereto. Although the novel lamp socket and panel construction of the present invention could be used in various kinds and types of applications, including applications where substantial vibrational forces are encountered, it is particularly useful for holding and positioning light bulbs for automotive vehicles, such as for holding and positioning a side marker light on an automotive vehicle. For the purposes of illustration and description, the novel lamp socket and panel assembly will be described as being used for the latter purpose.

Figure 1:
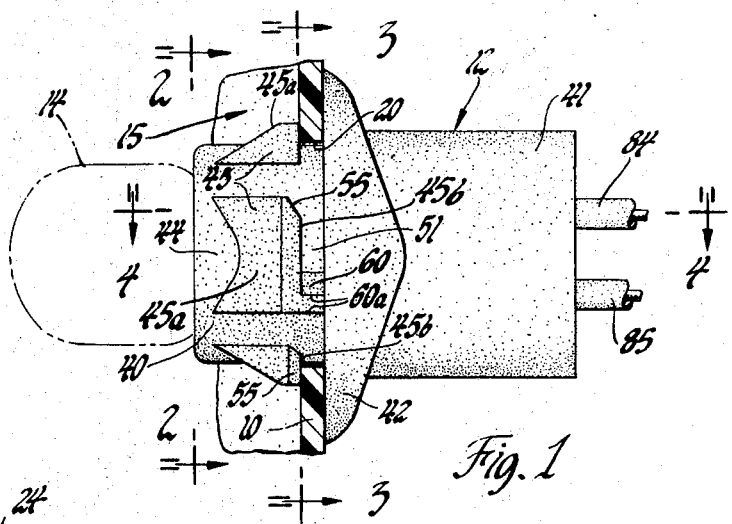
FIG. 1 is a side elevational view of the preferred embodiment of the lamp socket of the present invention and showing the same connected to a panel.
Figure 2:
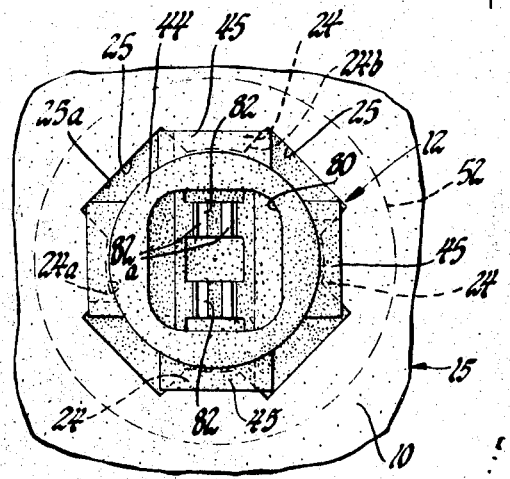
FIG. 2 is a fragmentary front elevational view looking in the direction of the arrow 2—2 of FIG. 1.

Referring to FIG. 1, the novel lamp socket and panel assembly comprises a panel 10 and a lamp socket 12 connected to the panel 10 and which holds a light bulb 14, such as the side marker light for an automotive vehicle. The panel 10 comprises a relatively thin, but rigid, member and, in the illustrated embodiment, is the bottom planar wall of a plastic, cup-shaped member 15 which provides a housing for the light bulb 14 and which is adapted to be secured in any suitable fashion to a fender of an automotive vehicle. It will, of course, be understood that the panel 10 could be the fender itself or any other suitable thin, but rigid or substantially rigid member.

The panel 10 has a central opening 20 therethrough. The opening has a central axis 21 and an outer peripheral surface defined by alternately spaced, radially extending lands and recesses 24 and 25 respectively. In the illustrated and preferred embodiment, four lands and four recesses spaced 90° apart are shown, although any suitable number of alternately spaced lands and recesses could be provided, if desired. The lands 24 at their innermost ends 24a are curved and lie on an inscribed circle 30, the inscribed circle 30 being indicated in phantom lines in FIG. 5.

Figure 5:
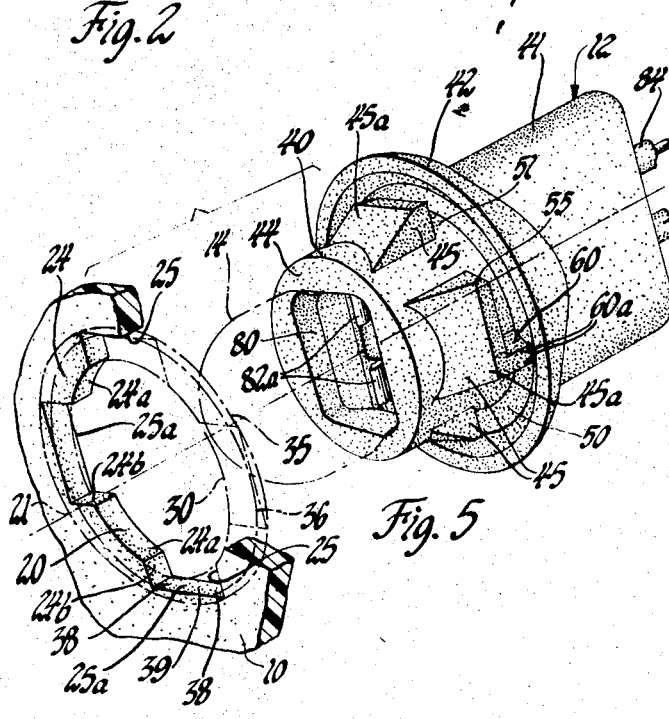
FIG. 5 is an exploded perspective view of the lamp socket and panel assembly shown in FIG. 1.

The recesses 25 are defined by an outer planar bottom or bottom surface 25a and the sides or side surfaces 24b of the lands 24. The sides 24b are planar and form a right angle juncture or corner with the bottoms 25a of the recesses 25. As best shown in FIG. 5, the corner junctures formed by the bottoms 25a and the sides 24b lie on a circumscribed circle, as indicated by reference numeral 35, having a diameter which is greater than the diameter of an inscribed circle, as indicated by reference numeral 36, tangent to the midpoints or midportions of the bottoms 25a of the recesses 25, the circles 35 and 36 having their centers coincident with the central axis 21 of the opening 20. Thus, the bottoms 25a of the recesses 25 at their ends 38 are radially spaced from the central axis 21 of the opening 20 a greater distance than at their midportions 39.

The lamp socket 12 comprises a one-piece body or member made from a suitable elastomeric plastic material, such as vinyl. The lamp socket broadly includes a forward portion 40, a rearward portion 41 and a radially extending, sealing flange or flange portion 42 intermediate its opposite ends.

The forward portion 40 comprises an annular or cylindrical part 44 provided with a plurality of circumferentially spaced lands 45 extending radially outwardly from its outer surface. In the illustrated embodiment, there are four lands 45 equally spaced 90° apart. The cylindrical part 44 has a diameter which is slightly less than the diameter of the inscribed circle 30 containing the innermost ends 24a of the lands 24 of the panel 10, and the lands 45 are shaped complementary with the recesses 25 in the panel 10 and dimensioned such that when the lands 45 are aligned with the recesses 25 in the panel 10, the forward portion 40 of the lamp socket 12 is freely insertable through the opening 20 in the panel 10. The lands 45 along their forward faces 45a are tapered to facilitate insertion through the opening 20 and have planar rearward end faces 45b which lie in a common plane extending radially of and normal to the longitudinal axis 48 of the lamp socket 12.

Figure 4:
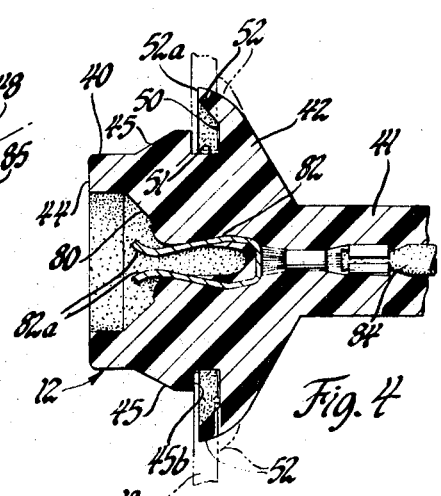
FIG. 4 is a fragmentary cross-sectional view taken approximately along line 4—4 of FIG. 1.

The radially extending flange 42 has a forward, radially extending, annular end face 50 parallel to the rearward end faces 45b of the lands 45 and which is spaced therefrom a distance slightly greater than the thickness of the panel 10. The rearward end faces 45b of the lands 45 and the forward end face 50 of the flange 42 define grooves 51 for receiving the lands 24 on the panel when the lamp socket 12 is rotated after being inserted through the opening 20 in the panel 10. The flange 42 also includes an outer, annular lip or lip portion 52 spaced radially outwardly of the lands 45 and which is inherently or self-biased toward the position shown in the solid lines in FIG. 4. When in this position, the lip 52 at its forwardmost end 52a is axially spaced from the radial plane containing the rearward end faces 45b of the lands 45 a distance less than the thickness of the panel 10. The annular lip 52 of the flange 42 has a diameter which is greater than the diameter of the circumscribed circle 35 containing the corners of the recesses 25 of the panel 10. The annular lip 52 of the flange 42 provides a seal between the lamp socket and the rearward end face of the panel 10 when the former is connected thereto, and in a manner to be hereinafter more fully described.

The lamp socket 12 is connected to the panel 10 by manually grasping the rearward end portion 41, aligning the lands 45 on the lamp socket 12 with the recesses 25 in the panel 10, inserting the forward end portion 40 of the lamp socket through the opening 20 in the panel until the annular lip 52 of the flange 42 engages the rearward side of the panel 10, and then rotating the lamp socket one-eighth turn or approximately 45° to position the lands 45 thereon behind the lands 24 of the panel 10 to lock the lamp socket 12 against relative axial movement with respect to the panel 10. In order to align the grooves 51 with the lands 24 on the panel 10 so that the lands 24 can be received therein when the lamp socket 12 is rotated one-eighth turn, the annular lip 52 has to be deflected rearwardly from its normal position, as shown by the solid lines in FIG. 4, in opposition to its self-biasing forces to a second position, as shown by the phantom lines in FIG. 4. This can be effected by either further pushing the forward portion of the lamp socket 12 through the opening 20 upon the lip 52 engaging the rearward side of the panel 10 prior to rotating the lamp socket one-eighth turn or by rotating the lamp socket 12 one-eighth turn upon the lip 52 merely engaging the panel 10. To the latter end, the lands 45 include a beveled portion or surface 55 (see FIG. 1) which is engageable with the lands 24 on the panel 10 as the lamp socket 12 is initially rotated and causes the forward portion 40 of the lamp socket 12 to be cammed further through the opening to align the grooves 51 with the lands 24 and lip 52 to be deflected toward its phantom line position shown in FIG. 4.

When the lamp socket 12 is connected to the panel 10, the locking relationship between the lands 45 and the lands 24 prevents relative axial movement between the lamp socket 12 and the panel 10. Also, since the annular lip 52 is deflected rearwardly from its normal position in opposition to its self-biasing forces, it frictionally engages the rearward side of the panel to provide a seal between the rearward side of the panel 10 and the lamp socket 12.

In accordance with the provisions of the present invention, the lamp socket 12 includes locking means which cooperates with the bottoms 25a of the recesses 25 to lock the lamp socket 12 against relative rotational movement with respect to the panel 10 when connected thereto. The locking means also function as a stop to limit the extent the lamp socket 12 can be rotated relative to the panel 10 so as to properly position the lands 45 thereon behind the lands 24 on the panel 10.

Figure 3:
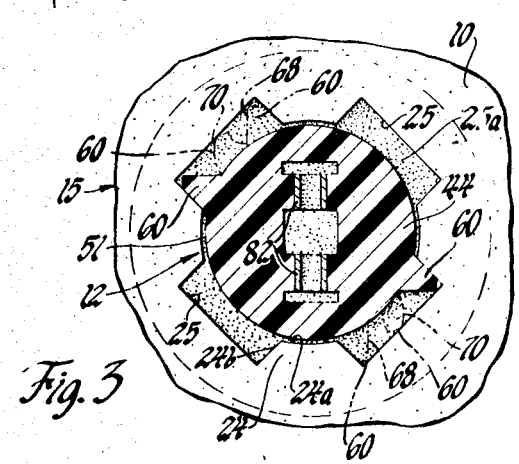
FIG. 3 is a fragmentary sectional view taken approximately along line 3—3 of FIG. 1.

The locking means comprises axially extending, relatively thin ribs 60 extending between the forward end face 50 of the flange 42 and the rearward end faces 45b of at least some of the lands 45, preferably two diametrically opposite lands 45. The ribs 60 are integral with the lands 45 and the flange 52 and are located adjacent the sides of the lands opposite the sides provided with the bevels 55. The ribs 60 are elastic or substantially elastic and extend radially outwardly so as to be flush with the radially outermost surface of the lands 45. The ribs are inherently or self-biased toward a normal position, as shown in FIGS. 3 and 5. The ribs 60 have their radially outermost end points 60a lying on a circumscribed circle whose diameter is greater than the diameter of the inscribed circle 36 containing the midpoints of the recesses 25, but less than the diameter of the circumscribed circle 35 containing the corners of the recesses 25. When the lands 45 are inserted through the recesses 25 in the opening 20, the ribs 60 are disposed at the corner adjacent an end 38 of the recesses 25, as shown by the phantom lines 68 in FIG. 3.

As the lamp socket 12 is being rotated one-eighth turn to connect the same to the panel 10, the ribs 60 will engage the bottom 25a of the recess as they approach the midpoint or portion of these bottom surfaces 25a. As the ribs 60 engage the bottoms 25a they will be deflected radially inwardly, as shown by the phantom lines 70 in FIG. 3, until they are moved past the midpoint 39 of the bottom surfaces 25a whereupon, due to their elasticity, they will reexpand radially outwardly toward their normal position. When the lamp socket 12 has been rotated the full one-eighth turn, the ribs 60 will be disposed adjancent the opposite corner at the opposite end 38 of the bottoms 25a of the recesses 25 and will assume or substantially assume their normal position, as shown by the solid lines in FIG. 3.

From the foregoing, it should be apparent that the ribs 60 provide an interlocking relationship with the bottoms 25a of the recesses 25 and serve to lock the lamp socket 12 against relative rotational movement with respect to the panel 10. For the lamp socket 12 to be rotated in the opposite direction to disconnect the same from the panel 10, it is necessary that the ribs 60 be radially deflected in order for them to clear the midpoints 39 of the bottoms 25a of the recesses 25. It has been found that this interlocking relationship is sufficient to hold the lamp socket in place even when the panel and lamp socket are subjected to substantial vibrational forces. It should be noted that the frictional engagement between the lip 52 and the panel 10 also aids in holding the lamp socket in place when connected to the panel 10. To remove or disconnect the lamp socket 12 from the panel 10, it is necessary that the lamp socket 12 be manually grasped and rotated in the opposite direction.

The axially extending ribs 60 also serve as a stop to properly position lands behind the lands 24 on the panel 10. The ribs 60 when the socket 12 is connected to the panel 10 engage a side 24b of the land 24 of the panel 10 and prevent further rotation of the socket 12.

The advantages of the above lamp socket construction are that it can be readily connected to and disconnected from the panel 10, it provides a seal with the rearward side of the panel 10 to prevent entry of water or foreign material into the cup-shaping housing 15, it is self-locked in place when connected and it cannot be over-rotated when connected to the panel 10.

The lamp bulb 14 is adapted to be received within a forward opening or cavity 80 in the forward portion 40 of the lamp socket 12 and electrically connected with a pair of spaced connectors 82 embedded within the lamp socket. The connectors 82 embedded within the lamp socket 12, in the illustrated embodiment, are for receiving a wedge base type lamp bulb. To this end, the connectors 82 each have a pair of resilient spring fingers 82a which receive the base of the lamp bulb to hold the lamp bulb in place as well as to provide an electrical connection therewith, the connectors in turn being crimped or otherwise secured to a pair of lead wires 84 and 85.

It will, of course, be understood that any suitable type of electrical connectors could be used or embedded in the lamp socket 12 so as to receive the base of any suitable type of lamp bulb.

Although the illustrated embodiment thereof has been described in great detail, it should be apparent that certain modifications, changes, and adaptations may be made in the illustrated embodiment, and that it is intended to cover all such modifications, changes and adaptations which come within the spirit of the present invention.

I claim:

1. A lamp socket and panel assembly comprising: a panel provided with an opening therethrough, said opening having a central axis and an outer peripheral surface defined by alternately spaced, radially extending lands and recesses and with the recesses having outer bottom surfaces whose end portions are radially spaced from the central axis a greater distance than their midportions, a lamp socket detachably connected to said panel, said lamp socket comprising a body made from an elastomeric plastic material and having a central longitudinal axis and forward and rearward portions and flange means extending radially of the body intermediate its ends, said forward portion having a cavity therein for receiving a lamp bulb and a plurality of circumferentially spaced radially extending lands and with the lands having rearward end faces which are axially spaced from said flange means to define grooves which receive the lands on the panel, and elastic ribs extending from some of the lands toward the flange means and whose outermost points are radially spaced from said central longitudinal axis of said body a given distance, said given distance being greater than the radius to the midportions of the bottom surfaces of the recesses, but less than the radial distance to the end portions of the bottom surfaces of the recesses of the panel, said elastic ribs being deflectable in opposite directions circumferentially of the body, said lamp socket being connected to the panel by aligning the lands on the lamp socket with the recesses in the opening in the panel, inserting the forward end of the lamp socket through the opening in the panel until the flange means engages the panel and then rotating the lamp socket a predetermined angular extent to position the lands thereon behind the lands on the panel, said ribs being engageable with the midportions of said bottom surfaces of said recesses and being deflectable radially inwardly from their normal position when said socket is being rotated to connect the same to the panel until the socket is rotated past the midportions whereupon they substantially assume their normal position to lock the socket against reverse rotational movement with respect to the panel, said ribs also being engageable with the lands of the panel when said lamp socket is rotated said predetermined angular extent to provide a stop and prevent over-rotation of the lamp socket relative to the panel.

2. A lamp socket and panel assembly comprising: a panel having an aperture therethrough whose peripheral surface is defined by alternately spaced, radially extending lands and recesses and with the recesses having outer bottom surfaces whose midpoints lie on an inscribed circle of a given diameter and whose end points at their juncture with the lands lie on a circumscribed circle having a diameter greater than the diameter of the inscribed circle, a lamp socket detachably connected to the panel, said lamp socket comprising a body having forward and rearward portions and an annular elastic flange extending radially of said body intermediate its ends and having a diameter greater than the diameter of said circumscribed circle of said aperture, said forward portion having a cavity therein for receiving a lamp bulb and a plurality of radially extending lands a circumferentially spaced locations and with the lands having rearward end faces which lie in a first plane extending transversely of said body portion, said first plane being spaced from a second plane containing the forwardmost end of said elastic flange an axial distance which is less than the thickness of said panel, and ribs extending from some of the lands to the radially extending flange and whose outermost radial points lie on a circumscribed circle having a diameter greater than the diameter of said inscribed circle of said aperture, said lamp socket being connected to said panel by aligning the lands on said lamp socket with the recesses in the aperture, inserting the lands through the recesses until said peripheral flange engages said panel and then rotating the lamp socket a predetermined angular extent to position the lands thereon behind the lands on said panel whereby said flange sealingly engages the adjacent side surface of the panel and axial movement of said lamp socket relative to said panel is prevented, said ribs being disposed adjacent one of the end points of said bottom surfaces of said recesses when said forward portion of said lamp socket is inserted through the aperture in the panel and as said socket is being rotated engaging said bottom surfaces and being deflected radially inwardly from their normal position until they are rotated past the midpoints of the bottom surfaces whereupon they assume their normal position to lock the lamp socket against reverse rotation, said ribs also engaging the lands on said panel to provide a stop to prevent over-rotation of said lamp socket when being connected to the panel.

3. A lamp socket and panel assembly as defined in claim 2 wherein said lands on said socket include beveled surfaces adjacent their rearward end faces, said beveled surfaces being engageable with the sides of said lands on said panel as the lamp socket is being rotated to connect the same to the panel and camming said lamp socket further through said aperture in opposition to the biasing force of the elastic flange so that the lamp socket can be further rotated to position the lands of the panel between the rearward end faces of the lands on the lamp socket and the flange.

References Cited

UNITED STATES PATENTS

| 833,342 | 10/1906 | Salisbury | 339—127 |
| Re. 20,032 | 7/1936 | Douglas | 339—127X |
| 2,793,351 | 5/1957 | Heath | 339—127 |
| 3,047,829 | 7/1962 | Mouat | 339—127 |

RICHARD E. MOORE, Primary Examiner

U.S. Cl. X.R.

339—127